(12) United States Patent
Summers

(10) Patent No.: US 10,473,430 B2
(45) Date of Patent: Nov. 12, 2019

(54) VISION ENHANCEMENT APPARATUS

(71) Applicant: Resident Artist Studio, LLC, Boxborough, MA (US)

(72) Inventor: Charles L. Summers, Boxborough, MA (US)

(73) Assignee: Resident Artist Studio, LLC, Boxborough, MA (US)

(*) Notice: Subject to any disclaimer, the term of this patent is extended or adjusted under 35 U.S.C. 154(b) by 0 days.

(21) Appl. No.: 15/671,434

(22) Filed: Aug. 8, 2017

(65) Prior Publication Data
US 2019/0049220 A1   Feb. 14, 2019

(51) Int. Cl.
*G02C 7/00* (2006.01)
*F41G 3/14* (2006.01)
*F21V 8/00* (2006.01)
*G02C 11/04* (2006.01)
*F41G 1/00* (2006.01)
*G02C 7/04* (2006.01)
*G02C 7/16* (2006.01)

(52) U.S. Cl.
CPC .............. *F41G 3/145* (2013.01); *F41G 1/00* (2013.01); *G02B 6/002* (2013.01); *G02C 7/04* (2013.01); *G02C 7/165* (2013.01); *G02C 11/04* (2013.01)

(58) Field of Classification Search
CPC . G02C 7/10; G02C 7/107; G02C 7/16; G02C 7/086; G02C 9/00

USPC ............................................... 351/53, 45, 46
See application file for complete search history.

(56) References Cited

U.S. PATENT DOCUMENTS

| 3,628,854 | A | * | 12/1971 | Jampolsky | G02C 5/001 |
| | | | | | 351/159.58 |
| 3,967,885 | A | * | 7/1976 | Byler | A61F 9/04 |
| | | | | | 351/46 |
| 8,418,395 | B2 | | 4/2013 | Summers | |
| 9,028,060 | B2 | * | 5/2015 | Schmitz | G02C 5/003 |
| | | | | | 351/53 |

* cited by examiner

*Primary Examiner* — Hung X Dang
(74) *Attorney, Agent, or Firm* — Cesari and McKenna, LLP

(57) ABSTRACT

A vision apparatus implemented as an optical device is disclosed. The optical device comprises a plurality of small apertures in an opaque material that is attached to a pair of eyeglasses or is a contact lens. The number and arrangement of small apertures defines the field of view and brightness of the image projected onto the user's retina. The opaque material is a collimator, and only small areas of the user's retina are illuminated by cones of light passing through the small apertures. Therefore, all of the light is rendered in focus. The optical device resolves the refractive errors of the eye of the user, improving the visual acuity of the user in any activity that requires depth of field with a large and bright field of view. Two optical devices, one for each eye, provide binocular vision with a variety of aperture arrangements to suit the user's needs.

9 Claims, 12 Drawing Sheets

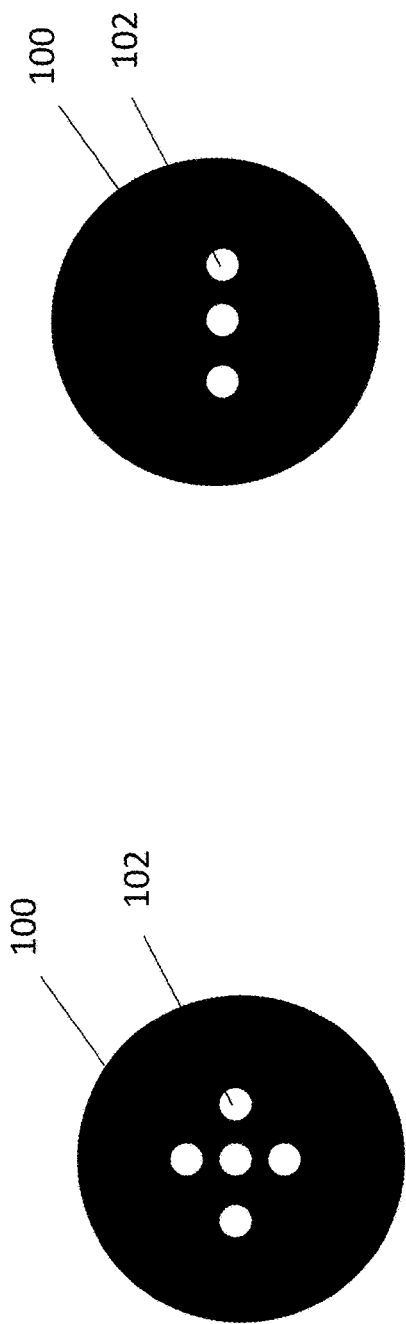
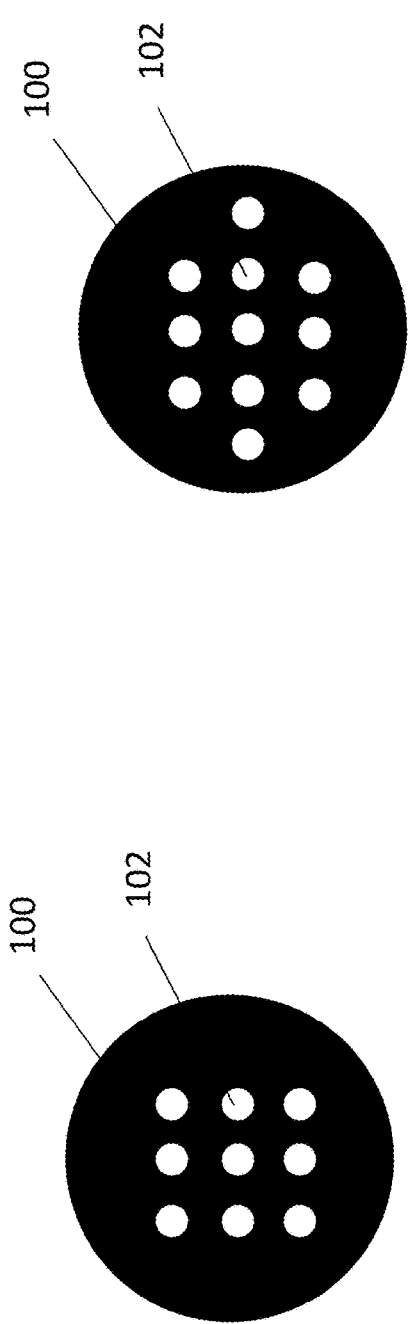

VISION ENHANCEMENT APPARATUS

BACKGROUND

Background Information

A noted problem arises when a person with impaired vision, such as either near-sightedness or far-sightedness, aims a firearm. Aiming, for example, a rifle equipped with open sights requires that the person simultaneously visualize a rear sight, a front sight, and the target. The rear sight may be an open iron sight at approximately 6-18 inches from the person's eye. The front sight is another approximately 2 to 3 feet further away, near the muzzle of the rifle. The target is at optical infinity, perhaps a few hundred feet to several thousand yards away. A person who cannot properly accommodate the lens of his/her eye to focus simultaneously to the rear sight, the front sight, and the target is unable to accurately aim the rifle.

For example, telescopic sights ("scope") have been adapted as sighting devices for rifles. The scope receives light rays at its objective lens which have been reflected by the target. The path of the light rays is appropriately modified by lenses of the scope, and exit from the eyepiece of the scope. The person adjusts the focus of the scope so that he can simultaneously visualize both a cross hair located in the scope and the target. The scope is aligned with the rifle so that when the cross hair appears to coincide with the target, the flight of the bullet will follow a substantially Galilean trajectory (allowance being made for air resistance) and strike the target at the spot indicated by the intersection of the cross hairs. However, a telescopic sight is a complicated attachment to a rifle, and so does not solve the problem of using open sights by a person who is unable to simultaneously visualize a rear open sight, a front sight, and the target. Further, scopes are expensive, and when a person owns several rifles, the cost of a scope for each may become prohibitive.

A vision enhancement apparatus comprising a small aperture in an opaque material has been proposed in commonly owned U.S. Pat. No. 8,418,395, entitled Vision Enhancement Apparatus to Improve Both Near And Far Vision, the contents of which are hereby incorporated by reference. The small aperture collimates the light reflected from the rear sight, the front sight, and the target so that the light from each passes through only a small area of the lens of the user's eye on its way to the user's retina. Accordingly, all of the light is rendered in focus on the person's retina, enabling the user to accurately aim the firearm. However, the preferred diameter of aperture is about 1.1 millimeters to 1.6 millimeters, or about 45/1000 of an inch. This single small aperture severely limits the user's field of view. Similarly, the amount of light entering through the aperture is limited, critically reducing the brightness of the image that the user sees.

More generally, a noted problem arises for people with minimal resources who are visually impaired. Prescription eyeglasses may be expensive and/or not readily available for those not living in certain areas.

SUMMARY

The disadvantages of the prior art are overcome by providing a vision enhancement apparatus that may be implemented as an optical device. An illustrative optical device comprises a plurality of small apertures in an opaque material that is attached to a pair of glasses worn by the user aiming a firearm. The small apertures collimate the light reflected from the rear sight, the front sight, and the target so that the light from each passes through only small areas of the lens of the user's eye on its way to the user's retina. The number and arrangement of small apertures defines the field of view and brightness of the image projected onto the user's retina. The opaque material is a collimator. Accordingly, only small areas of the user's lens, and then retina, are illuminated by cones of light rays passing through the small apertures. Therefore, all of the light is rendered in focus on the user's retina. The user can see the rear sight, the front sight, and the target together. In addition, the image that the user sees has an enhanced field of view and enhanced brightness compared to a collimator with only a single aperture.

While a user may employ the optical device in aiming a firearm at a target, the optical device can more generally resolve the refractive errors of the eye of the user, improving his or her visual acuity, in any activity that requires depth of field with a large and bright field of view. One example may be a musician who needs to simultaneously focus on sheet music and a conductor. The sheet music may be two feet away in the musician's intermediate vision, and the conductor may be twenty feet away in the musician's far vision. The optical device allows the musician to see both the sheet music and the conductor in focus, with a large and bright field of view. Further, the optical device is advantageous to users with vision challenges and little or no resources and/or optical professional services. A pair of non-prescription safety glasses and two optical devices, one on each lens, provide binocular vision with a variety of aperture arrangements to suit the user's needs.

The apertures may be illustratively formed in a circular piece of opaque static cling vinyl. The apertures may have a size range of approximately 1 to 1.6 millimeters each. The diameter of the circular piece of opaque static cling vinyl may be conveniently sized as approximately 15 to 20 millimeters. Static cling vinyl has an electrostatic property that causes it to be electrically attracted to many materials, especially materials which eyeglasses are made of.

The glasses worn by the user may be of any type, including, e.g., ordinary vision correction glasses, polycarbonate such as used in prescription safety eyeglasses, bifocals with visible lines between different radii ground into the glasses, blended lens bifocals, safety glasses such as the sort which people firing a firearm wear for mechanical protection of their eyes, ordinary sunglasses, etc.

In another embodiment, the optical device may be attached to the viewing windows of a gas mask or respirator. The diameter of the circular piece of opaque static cling vinyl may be larger to accommodate the larger viewing windows of the gas mask or respirator. The apertures may also be larger because the optical device is further away from the user's eyes than with regular glasses.

An alternative embodiment of the optical device may be in the form of a contact lens. Illustratively, the contact lens may be mostly made from an opaque material. The mostly opaque contact lens comprises a plurality of small apertures where the contact lens material is translucent. The small apertures of translucent material collimate the light. Their number and arrangement defines the field of view and brightness of the image projected onto the user's retina.

BRIEF DESCRIPTION OF THE DRAWINGS

The description below refers to the accompanying drawings, of which:

FIG. 1A-1D is a depiction of representative front views of exemplary embodiments of an inventive optical device;

DETAILED DESCRIPTION OF AN ILLUSTRATIVE EMBODIMENT

Figure 2:
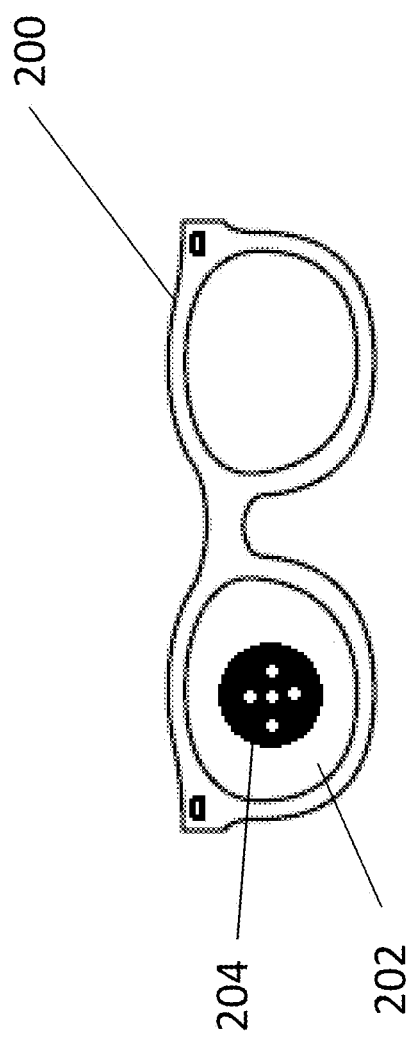
FIG. 2 is a front view of the optical device attached to eyeglasses.

This invention relates to a vision enhancement apparatus and in particular to simultaneous improvement of both near and far vision. For example, the vision enhancement is applicable to improved sighting of firearms, where it is important for a user aiming firearms to simultaneously visualize a rear sight, a front sight, and the target. The rear sight is the user's near vision, the front sight is in the user's intermediate vision, and the target is in the user's far vision. At the same time, the user may desire a field of view that is as large as possible and as bright as possible while still keeping objects in the user's near vision, intermediate vision, and far vision in focus. A user who is either nearsighted or far-sighted is greatly helped by the simplicity of the present invention.

It should be noted that while several embodiments are described in relation to a user aiming a firearm, the principles of the present disclosure may be utilized for anyone who is visually impaired and needs a wide field of view. As such, the description of aiming a firearm should be taken as exemplary only.

FIGS. 1A, 1B, 1C, and 1D show representative front views of exemplary embodiments of a vision enhancement apparatus, hereinafter referred to as optical device 100. The optical device 100 has an outside diameter chosen to conveniently fit on commonly worn eyeglasses. A diameter between approximately three quarters of an inch to approximately one inch has been found convenient. Stated in millimeters, diameters between approximately 15 millimeters and approximately 25 millimeters have been found convenient. Optical device 100 has a plurality of apertures 102. The apertures 102 may be arranged in a pattern to form a field of view of a desired shape, size, and brightness. The field of view may be a circular field of view or an ellipsoid field of view. An illustrative diameter of apertures 102 has been found to be approximately 1.1 millimeters to approximately 1.6 millimeters, or approximately $45/1000$ of an inch to approximately $62/1000$ of an inch. It should be noted that the dimensions mentioned herein are illustrative and differing sizes and/or shapes may be utilized in accordance with alternative embodiments of the present disclosure. For example, as described above, the optical device may be attached to viewing windows of a gas mask or respirator. Illustratively, the diameter of the optical device and the diameter of the apertures would then be larger to accommodate the larger viewing windows and the increased distance between the windows and the user's eyes. As such, the specific sizes and ranges of sizes of the apertures should be taken as exemplary only.

The optimum diameter of apertures 102 depends upon the mechanical arrangement of the eyeglasses worn by the user. When large safety glasses that cover ordinary eyeglasses are worn by the user, the optical device 100 is moved further away from the pupil of the user's eye. In this case, a larger diameter of aperture 102 may be used, as the solid angle subtended by aperture 102 at the retina of the user's eye depends on both the area of aperture 102 and the square of the distance between the aperture and the user's retina. Moving the optical device 100 further away from the retina then requires a larger diameter for aperture 102 in order to maintain the same solid angle as obtained by direct application of the optical device 100 to ordinary vision correcting eyeglasses. Alternatively, the optical device 100 may be applied to the user's vision correcting eyeglasses instead of the safety glasses.

Optical device 100 is illustratively made from static cling vinyl. In accordance with one illustrative embodiment, static cling vinyl in sheets of approximately 0.010 inch thickness is cut into circular optical devices of approximately ¾ inches diameter. Illustratively, the optical device 100 is made of opaque material, which stops light that interferes with the cones of rays passing through the apertures 102. Only light passing through the apertures 102 is useful in aiming the firearm, and so blocking other light from reaching the user's eye improves the image as the user visualizes the rear sight, front sight, and target.

The surface of optical device 100 illustratively is a flat or matte finish to reduce reflections. However, the inner surface, i.e., toward the eye of the user, may be made glossy in order to increase adhesion to the surface of the eyeglasses by the static cling vinyl. In alternative embodiments, where static cling vinyl is not used as a material, the inner surface may be either flat/matte or glossy.

FIG. 2 shows an illustrative embodiment of the invention 204 attached to a lens 202 of a user's eyeglasses 200. In one illustrative embodiment, the optical device 204 may be made by use of a mold using a liquid which solidifies into a static cling vinyl, by use of an injection molding process. Alternatively, a sheet of static cling vinyl may be punched out to form the exemplary optical device 204. As noted above, the optical device 204 is illustratively made of opaque material so that it stops light except at the apertures. A color of static cling vinyl of black has been found to be satisfactory. However, it should be noted that other colors may be utilized in accordance with alternative embodiments of the present disclosure.

Eyeglasses may be made of polycarbonate which has been found to work satisfactorily with an optical device 204 made of static cling vinyl. Other materials from which eyeglasses and safety goggles are made have also been found to work satisfactorily with static cling vinyl. Illustratively, the optical device 204 adheres by electrostatic attraction to the material of lens 202 of eyeglasses 200 worn by the user. In alternative embodiments other types of surface attraction may be utilized in place of electrostatic attraction. Goggles (not shown) which fit over eyeglasses may also be used with an optical device 204 adhered to the outer surface of the goggles. Alternatively, the optical device 204 may remain attached to the user's eyeglasses 200 instead of the goggles.

As noted above, the optical device 204 may be used in a wide variety of environments. The optical device 204 resolves refractive errors of a user's eye, thereby improving the visual acuity of the user in any activity that requires depth of field and a large field of view. The optical device 204 may prove very useful in those regions where people have vision issues and little or no resources and/or professional optical services. In such environments, a cheap solution is to use non-prescription safety glasses with an optical device 204 attached to each lens. This would enable the user to correct their vision at a low cost and without the need for expensive optical equipment.

Figure 3:
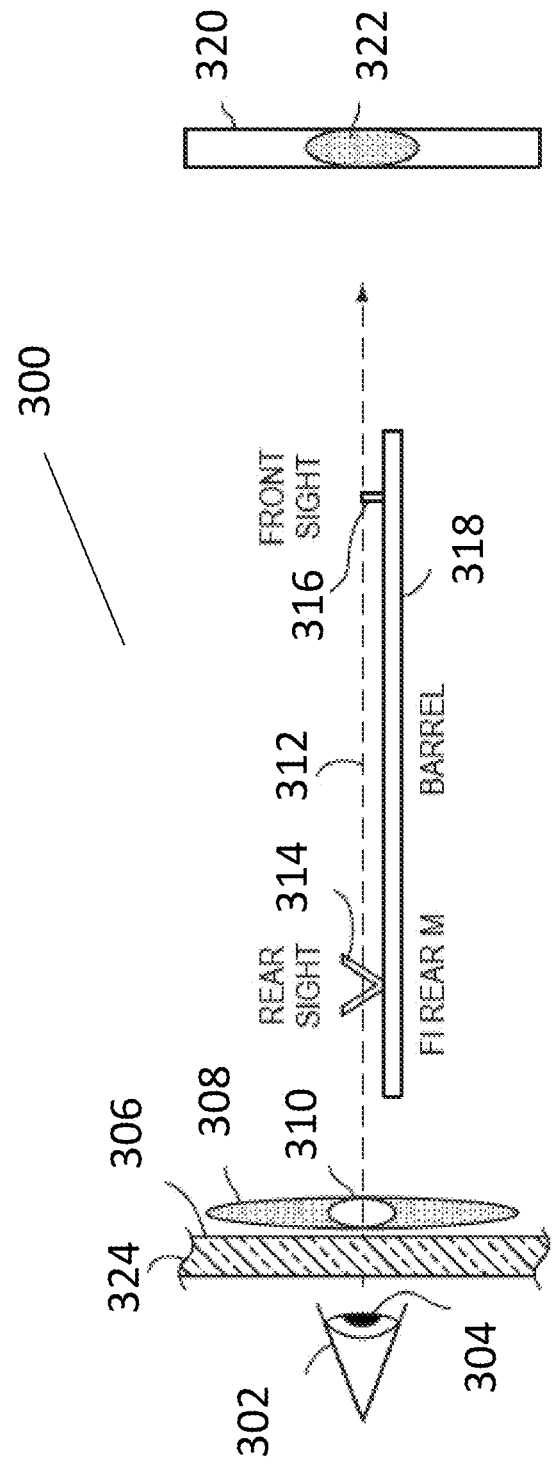
FIG. 3 is a side view of the prior art.

FIG. 3 shows a side view schematic diagram of the prior art. A firearm barrel 318 has a rear open iron sight 314 and a post front sight 316. It is intended to aim the firearm with barrel 318 at target 320. The prior art optical device 308 is attached to a front surface 306 of a lens 324 of eyeglasses worn by a user (not shown) aiming the firearm at target 320. The user's eye 302 has the pupil 304 aligned along sight line 312 (indicated by a dashed line) through an aperture 310 of the optical device 308. Also, the line of sight 312 passes through the rear sight 314 and across the top of post sight 316, and extends beyond barrel 318 to intersect the bullseye 322 of target 320. The rear sight 314 and front sight 316 are adjusted so that a bullet fired by the firearm with barrel 318 will travel along a Galilean trajectory (not shown) and hit the target 320 when the sight line, beginning at the pupil 304 of the user's eye 302, through the aperture 310 of the optical device 308, and through the rear sight 314 and across the top of the post sight 316 intersects the bullseye 322 of target 320. The prior art optical device 308 results in a field of view that is limited and dim.

Figure 4:
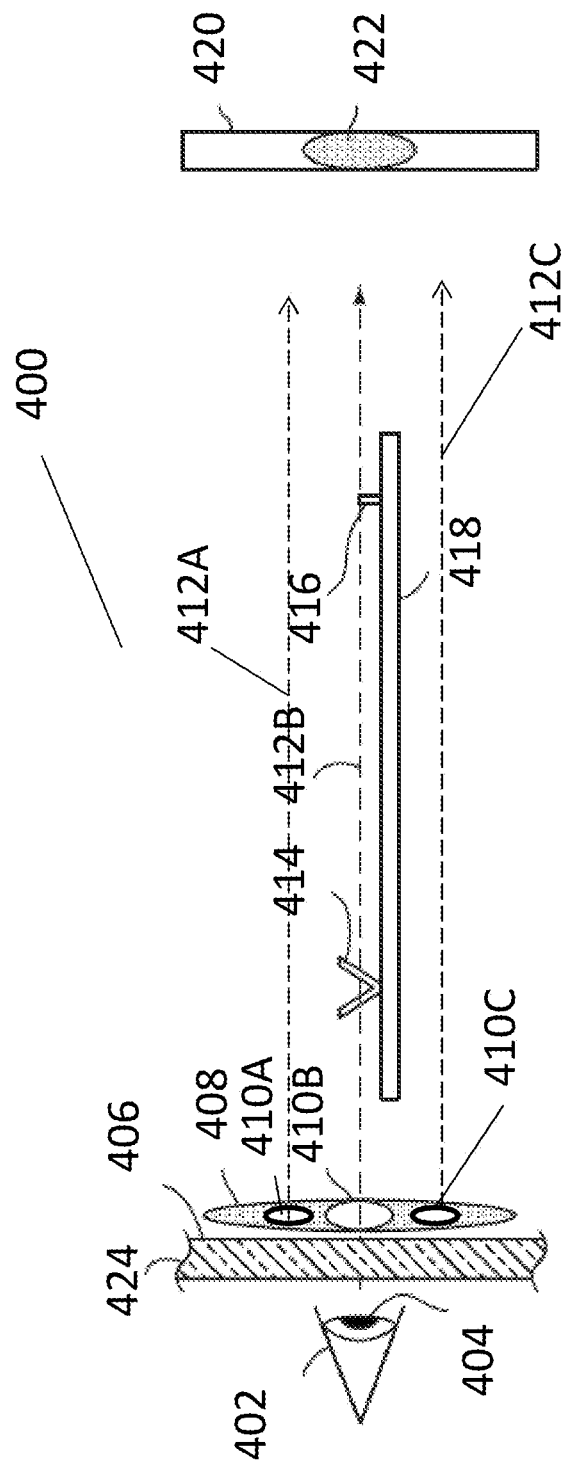
FIG. 4 is a side view of an exemplary vision enhancement apparatus in accordance with an illustrative embodiment of the present invention.

FIG. 4 shows a side view schematic diagram of an illustrative embodiment of the invention. A firearm barrel 418 has a rear open sight 414 and a post front sight 416. It is intended to aim the firearm with barrel 418 at target 420. The optical device 408 is attached to a front surface 406 of a lens 424 of eyeglasses worn by a user (not shown) aiming the firearm at target 420. The user's eye 402 has the pupil 404 aligned along sight lines 412 (indicated by dashed lines) through apertures 410 of the optical device 408. A line of sight 412B may pass through the rear sight 414 and across the top of post sight 416, and may extend through barrel 418 to intersect the bullseye 422 of target 420. The rear sight 414 and front sight 416 are adjusted so that a bullet fired by the firearm with barrel 418 will travel along a Galilean trajectory (not shown) and hit the target 420 when a sight line, beginning at the pupil 404 of the user's eye 402, through an aperture 410B of the optical device 408, and through the rear sight 414 and across the top of post sight 416 intersects the bullseye 422 of target 420. Another line of sight 412A or 412C may begin at the pupil 404 of the user's eye 402, through a respective aperture 410A or 410C of the optical device 408, and intersect the target 420 at or close to bullseye 422.

The optical device 408 is a collimator, and apertures 410 collimate the light. Optical device 408 is made of opaque material with holes formed therein to form apertures 410. The opaque material stops unwanted light. Cones of light rays passing through apertures 410 of the collimator 408 travel through lens 424 of the user's eyeglasses (not shown) so that the rays in each cone are substantially perpendicular to the plane of the lens. Also, the cones of rays enter the eye 402 of the user so that the rays impinge on only a small number of rods and cones (not shown) of the user's retina (not shown).

Figure 5:
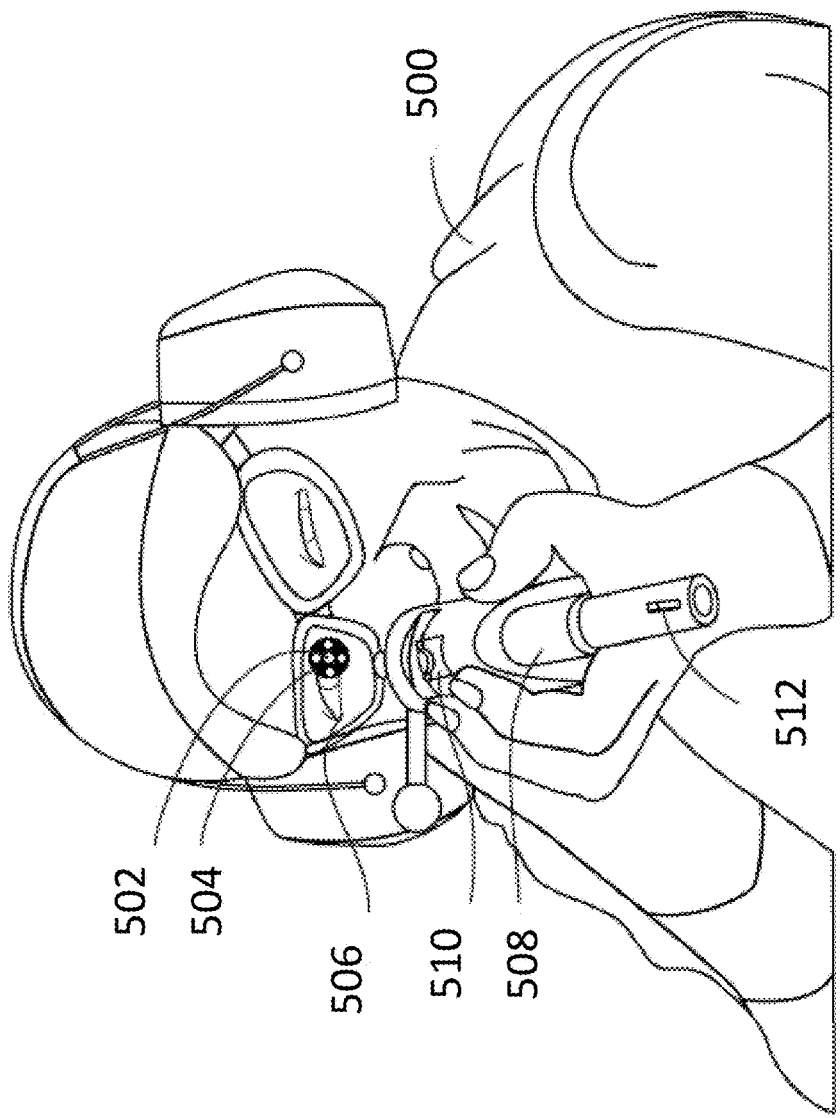
FIG. 5 illustrates use of a vision enhancement apparatus in aiming a rifle.

FIG. 5 shows a user 500 aiming rifle 508. The user 500 is wearing eyeglasses 506. An optical device 504 is attached to eyeglasses 506 by electrostatic attraction between the static cling vinyl of optical device 504 and the lens of eyeglasses 506. The rifle 508 has rear sight 512 and front sight 510. The apertures 502 of optical device 504 help the user 500 to simultaneously visualize the rear sight 512, the front sight 510, and the target as indicated in FIG. 4.

Figure 6:
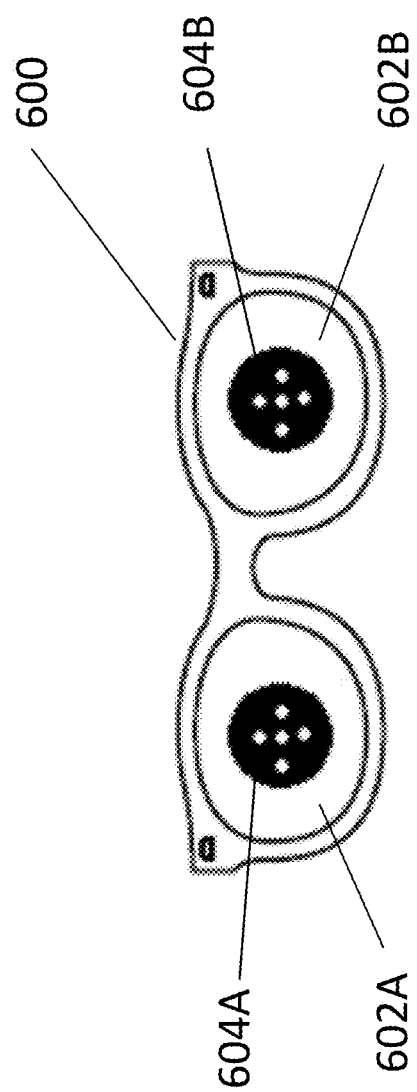
FIG. 6 is a front view of two optical devices attached to eyeglasses.

FIG. 6 shows an illustrative embodiment of two optical devices 604 attached to both lenses 602 of a user's eyeglasses 600. One optical device 604 is attached to each lens 602. In one illustrative embodiment, the optical devices 604 may be punched out of a sheet of static cling vinyl. As noted above, the optical devices 604 are illustratively made of opaque material so that they stop light except at the apertures. The exemplary optical devices 604 adhere by electrostatic attraction to the material of the front surface of lenses 602 of eyeglasses 600 worn by the user. The embodiment shown in FIG. 6 may be used to achieve a low cost vision correction by using non-prescription lenses and a pair of optical devices 604 as shown. This may be useful in those areas without easy access to lens grinding technology, etc.

Figure 7:
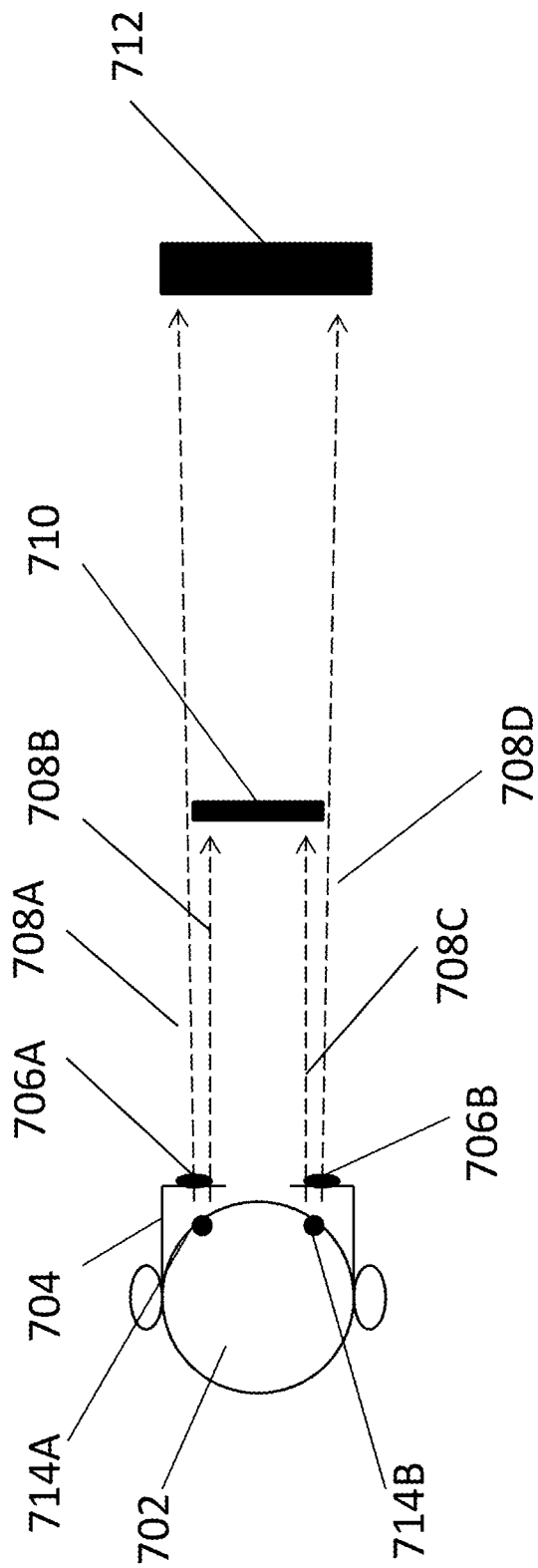
FIG. 7 is a top view illustrating use of two optical devices in simultaneously focusing on a near and a far object.

FIG. 7 shows a top view schematic diagram of an illustrative embodiment of the invention. A user 702 is wearing eyeglasses 704. One optical device 706 is attached to a front surface of each lens (not shown) of the user's glasses 704. The user 702 is simultaneously focusing on two objects 710 and 712. Object 710 is in the near vision of user 702, and object 712 is in the far vision of user 700. The user's eyes 714 have the pupils (not shown) aligned along sight lines 708 through the apertures of the optical devices 706. A line of sight 708A may begin at the pupil of the user's eye 714A, pass through an aperture of the optical device 706A and intersect the far object 712. A second line of sight 708B may begin at the pupil of the user's eye 714A, pass through an aperture of the optical device 706A and intersect the near object 710. A third line of sight 708C may begin at the pupil of the user's eye 714B, pass through an aperture of the optical device 706B and intersect the near object 710. A fourth line of sight 708D may begin at the pupil of the user's eye 714B, pass through an aperture of the optical device 706B and intersect the far object 712. The two optical devices 706, one on each lens of eyeglasses 704, provide binocular vision with a variety of aperture arrangements to suit the user's needs.

Figure 8:
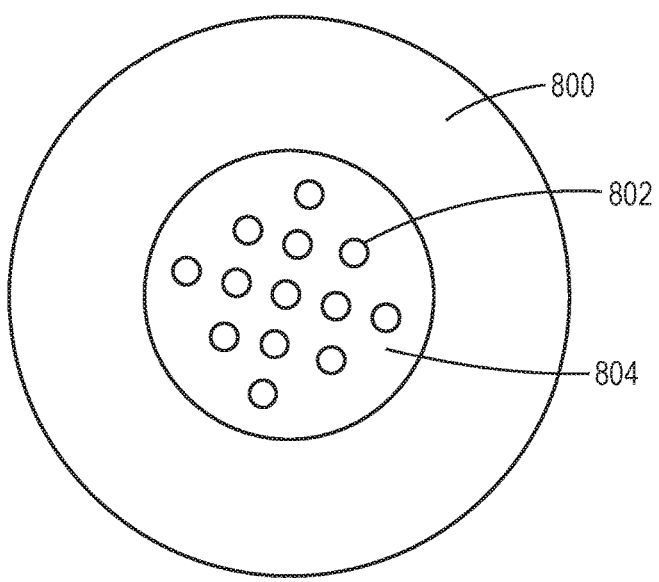
FIG. 8 is a front view of a template for manufacturing a vision enhancement apparatus in accordance with an illustrative embodiment of the present invention.

FIG. 8 shows a template 800 to manufacture optical device 100. A circular patch of static cling vinyl of the desired size, such as ¾ of an inch in diameter, is placed on template 800 so that the patch of static cling vinyl lines up with indentation 804. The desired apertures can then be punched out from the patch of static cling vinyl through template holes 802. The arrangement of holes 802 allows the manufacturer to produce optical devices 100 having different fields of view as defined by the number and arrangement of apertures, such as the various arrangements shown in FIG. 1. An arrangement according to the desired field of view, such as a circular field of view or an ellipsoid field of view, is chosen by the manufacturer. Template 800 then allows the manufacturer to produce an optical device 100 having apertures of the required size, spacing, and arrangement.

Figure 9:
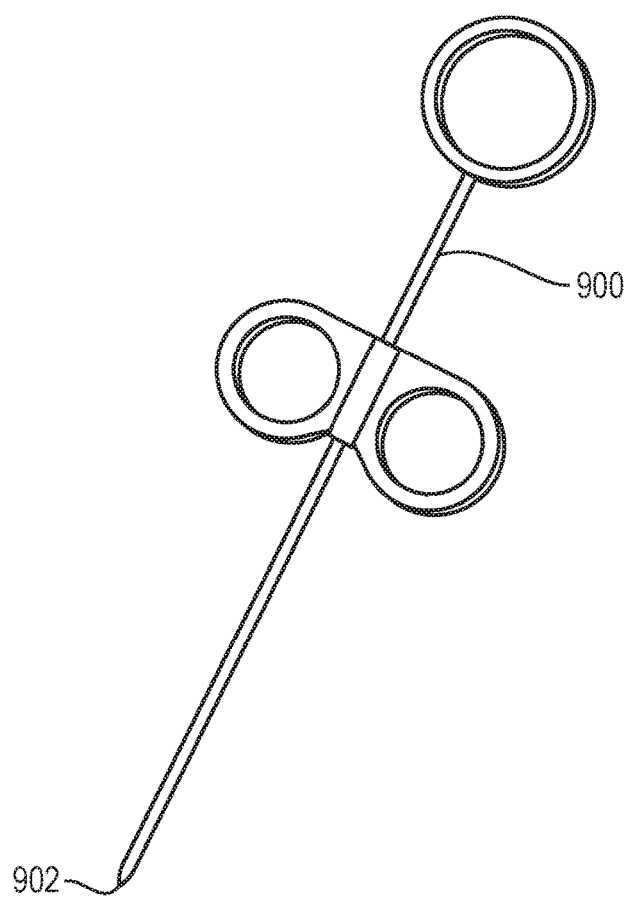
FIG. 9 is a front view of a tool for manufacturing a vision enhancement apparatus in accordance with an illustrative embodiment of the present invention.

FIG. 9 shows a tool 900 to manufacture optical device 100. Using the template 800, pointed end 902 of tool 900 is pushed through template holes 802 in order to punch out the desired number of apertures from the patch of static cling vinyl. The pointed end 902 of tool 900 preferably is of the same size and shape as the template holes 802 of template 800. Illustratively, tool 900 may be a thin-wall tube that has been sharpened by a taper to obtain an edge 902 which cuts the opaque static cling material, leaving a clean aperture of the desired diameter with no edge defects.

Figure 10:
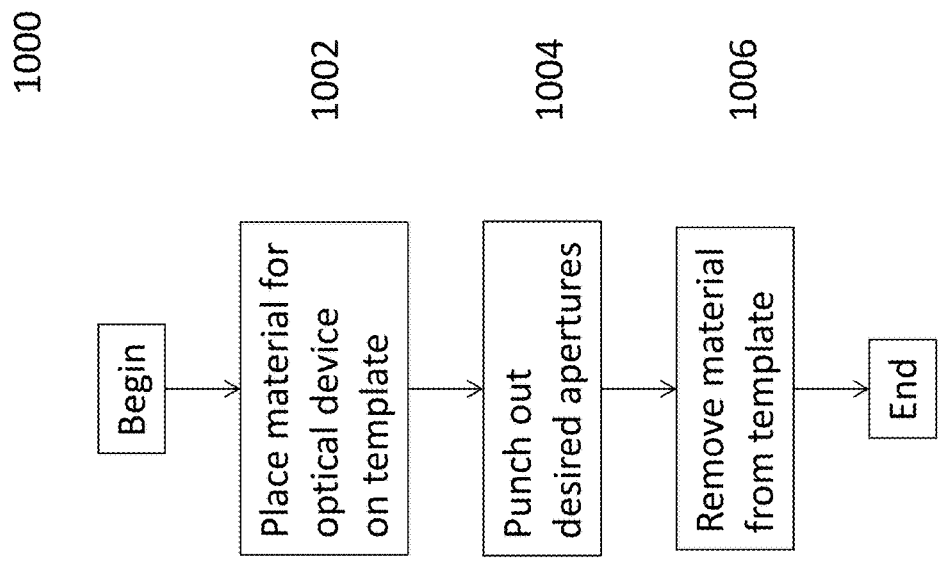
FIG. 10 is a flowchart of the steps necessary for manufacturing vision enhancement apparatus in accordance with an illustrative embodiment of the present invention.

FIG. 10 shows a flowchart 1000 depicting the steps of a method for manufacturing optical device 100. In step 1002, the material for the optical device is placed on a template. The material may be a patch of static cling vinyl. The template may be a template as shown in FIG. 8. The patch of static cling vinyl may be circular and sized so that it fits into indentation 804 of template 800. In step 1004, the desired apertures are punched out from the material. If a template such as the one shown in FIG. 8 is used, the arrangement of holes in the template allows the manufacturer to produce optical devices having different fields of view as defined by the number and arrangement of apertures, such as the various arrangements shown in FIG. 1. A tool as shown in FIG. 9 may be used to punch out the desired apertures in step 1004. In step 1006, the material for the optical device with the punched out apertures is removed from the template.

Figure 11B:
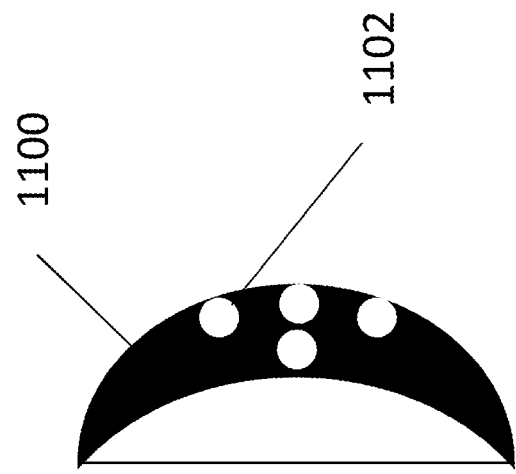
FIG. 11B is a perspective side view of an alternative embodiment of the optical device.
Figure 11A:
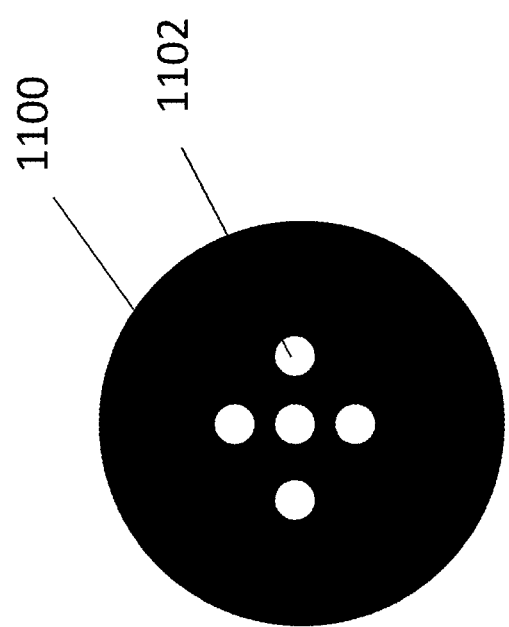
FIG. 11A is a front view of an alternative embodiment of the optical device.

FIGS. 11A and 11B show an alternative embodiment of an inventive optical device in the form of a contact lens. Illustrative optical device 1100 is manufactured from a translucent material mostly overlaid by a collimator made from an opaque material to avoid lack of contrast by additional stray light pollution. The optical device 1100 has an outside diameter chosen to conveniently fit a user's eye. An optimal diameter is individually fitted to match the size of the user's cornea, but diameters between approximately 12 millimeters and approximately 16 millimeters have been found convenient. Optical device 1100 further has a base curve, which is the radius at the back surface of optical device 1100. An optimal base curve is individually fitted to match the curvature of the user's cornea, but base curves between approximately 8 millimeters and approximately 9 millimeters have been found convenient. The collimator of optical device 1100 has a plurality of apertures 1102. The translucent apertures 1102 may be arranged in a pattern to form a field of view of a desired shape, size, and brightness. The field of view may be a circular field of view or an ellipsoid field of view. The optimum diameter of apertures 1102 is smaller than the optimum diameter of apertures 102 of non-contact lens optical device 100, because the optical device 1100 is closer to the pupil of the user's eye. As the solid angle subtended by aperture 1102 at the retina of the user's eye depends on both the area of aperture 1102 and the square of the distance between the aperture and the user's retina, moving the optical device 1100 closer to the retina then requires a smaller diameter for aperture 1102 in order to maintain the same solid angle as would be obtained by attaching an optical device 100 to eyeglasses. Illustratively, the distance between the optical device 1100 and the user's retina may be approximately 25 millimeters. An illustrative diameter for aperture 1102 has been found to be approximately 0.68 millimeters. Optical device 1100 may illustratively be made from a hard polymer that is naturally porous enough to allow oxygen to reach the user's eye, it may be made from a water-absorbing polymer, or it may be made from any other material that is usable for the production of contact lenses.

Figure 12:
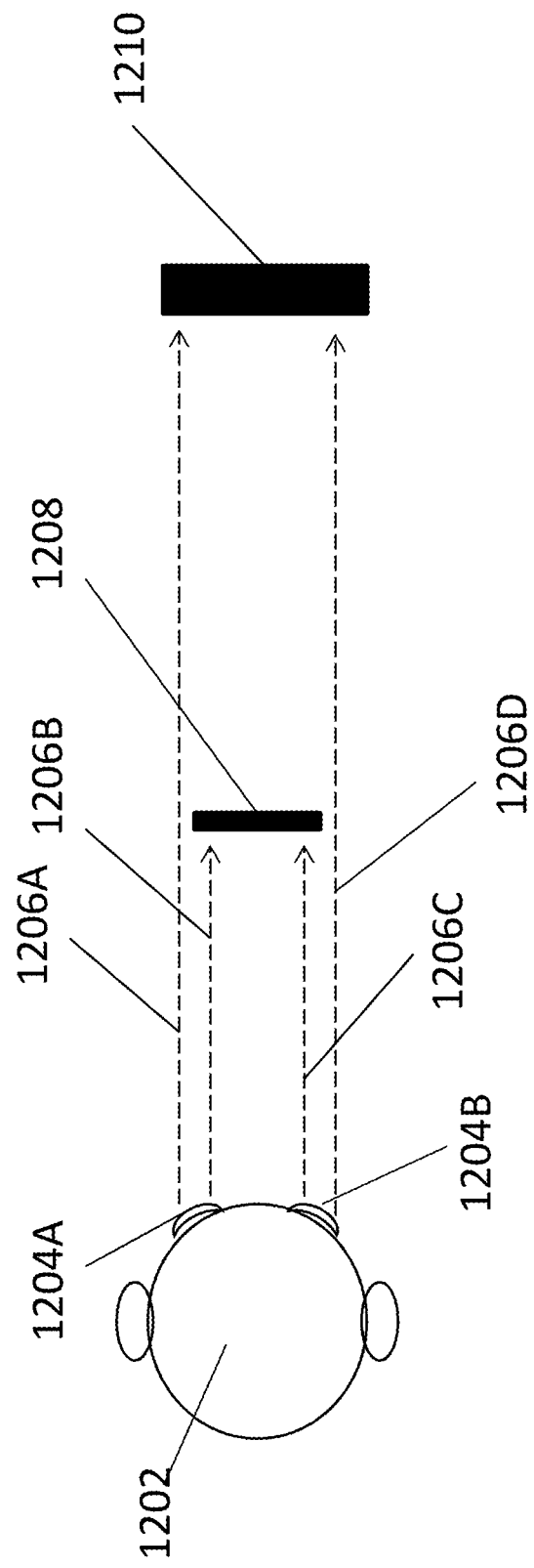
FIG. 12 is a top view illustrating use of two alternative embodiments of the optical device in simultaneously focusing on a near and a far object.

FIG. 12 shows a top view schematic diagram of an illustrative embodiment of the invention. A user 1202 is wearing two optical devices 1204 in the form of contact lenses. One optical device 1204 is placed on each one of the user's eyes. The user 1202 is simultaneously focusing on two objects 1208 and 1210. Object 1208 is in the near vision of user 1202, and object 1210 is in the far vision of user 1202. The user's eyes have the pupils (not shown) aligned along sight lines 1206 through the apertures of the optical devices 1204. A line of sight 1206A may begin at the pupil of the user's left eye, pass through an aperture of the optical device 1204A and intersect the far object 1210. A second line of sight 1206B may begin at the pupil of the user's left eye, pass through an aperture of the optical device 1204A and intersect the near object 1208. A third line of sight 1206C may begin at the pupil of the user's right eye, pass through an aperture of the optical device 1204B and intersect the near object 1208. A fourth line of sight 1206D may begin at the pupil of the user's right eye, pass through an aperture of the optical device 1204B and intersect the far object 1210. The two optical devices 1204, one on each eye of the user, provide binocular vision with a variety of aperture arrangements to suit the user's needs.

The foregoing description has been directed to specific illustrative embodiments of this invention. However, it will be apparent that other variations and modifications may be made to the described embodiments, with the attainment of some or all of their advantages. Specifically, various sizes, diameters and ranges have been described. It is expressly noted that all such values should be taken as exemplary only and not limiting the invention. Therefore, it is the object of the appended claims to cover all such variations and modifications as come within the true spirit and scope of the invention.

What is claimed is:

1. An apparatus, comprising:
    a collimator of static cling vinyl, the static cling vinyl having electrostatic attraction to a lens of eyeglasses, the attraction sufficient to attach the static cling vinyl to the lens, the lens having a length and a width, the collimator made of opaque material that is substantially circular having a diameter, the diameter being less than the length and less than the width of the lens of the eyeglasses;
    wherein the collimator has a plurality of apertures formed as holes in the opaque material, the apertures limiting light to cones of rays passing through the apertures and around an outside of the opaque material;
    a firearm having a rear sight and a front sight, wherein the rear sight, the front sight, and a target of the firearm are simultaneously visualized through the plurality of apertures.

2. The apparatus of claim 1, wherein the plurality of apertures is arranged in a pattern, the pattern of apertures forming a field of view of a desired shape, size, and brightness.

3. The apparatus of claim 2, wherein the shape of the field of view is substantially circular.

4. The apparatus of claim 2, wherein the shape of the field of view is substantially ellipsoid.

5. The apparatus of claim 1, wherein the eyeglasses are one of vision correction eyeglasses, prescription safety eyeglasses, safety glasses, and sunglasses.

6. The apparatus of claim 1, wherein a user wearing the eyeglasses generates a sight line from an eye of the user through each aperture of the plurality of apertures of the collimator and to an object which it is desired to visualize, the collimator optically clearing the vision of the eye of the user for visualization of the object.

7. An apparatus, comprising:
- a collimator of opaque material, the opaque material being attached to a lens of eyeglasses, the lens having a length and a width, the collimator being substantially circular and having a diameter, the diameter being less than the length and less than the width of the lens of the eyeglasses;
- wherein the collimator has a plurality of apertures formed as holes in the opaque material, the apertures limiting light to cones of rays passing through the apertures and around an outside of the opaque material; and
- wherein the plurality of apertures is arranged in a pattern, the pattern of apertures forming a field of view of a desired shape, size, and brightness;
- a firearm having a rear sight and a front sight, wherein the rear sight, the front sight, and a target of the firearm are simultaneously visualized through the plurality of apertures.

8. The apparatus of claim 7, wherein the shape of the field of view is substantially circular.

9. The apparatus of claim 7, wherein the shape of the field of view is substantially ellipsoid.

\* \* \* \* \*